United States Patent
Kikuchi et al.

(10) Patent No.: US 9,086,643 B2
(45) Date of Patent: Jul. 21, 2015

(54) IONIC ELECTRO-CONDUCTIVE RESIN AND ELECTRO-CONDUCTIVE MEMBER FOR ELECTROPHOTOGRAPHY

(75) Inventors: Yuichi Kikuchi, Susono (JP); Kazuhiro Yamauchi, Suntou-gun (JP); Norifumi Muranaka, Yokohama (JP); Satoru Nishioka, Suntou-gun (JP)

(73) Assignee: CANON KABUSHIKI KAISHA, Tokyo (JP)

(*) Notice: Subject to any disclaimer, the term of this patent is extended or adjusted under 35 U.S.C. 154(b) by 321 days.

(21) Appl. No.: 13/551,554

(22) Filed: Jul. 17, 2012

(65) Prior Publication Data

US 2012/0281998 A1 Nov. 8, 2012

Related U.S. Application Data

(63) Continuation of application No. PCT/JP2012/001525, filed on Mar. 6, 2012.

(30) Foreign Application Priority Data

Mar. 30, 2011 (JP) ................................ 2011-074975
Feb. 22, 2012 (JP) ................................ 2012-036566

(51) Int. Cl.
*G03G 15/02* (2006.01)
*C08G 59/22* (2006.01)
*C09D 163/00* (2006.01)
*H01B 1/12* (2006.01)

(52) U.S. Cl.
CPC .......... *G03G 15/0233* (2013.01); *C08G 59/226* (2013.01); *C09D 163/00* (2013.01); *H01B 1/122* (2013.01)

(58) Field of Classification Search
None
See application file for complete search history.

(56) References Cited

U.S. PATENT DOCUMENTS

| 7,947,339 | B2 | 5/2011 | Yamauchi et al. |
| 2004/0057749 | A1* | 3/2004 | Saito et al. ................. 399/109 |
| 2012/0020700 | A1 | 1/2012 | Yamada et al. |
| 2012/0027456 | A1 | 2/2012 | Muranaka et al. |
| 2012/0070188 | A1 | 3/2012 | Hirakoso et al. |
| 2012/0251171 | A1 | 10/2012 | Muranaka et al. |
| 2012/0263499 | A1 | 10/2012 | Yamauchi et al. |

FOREIGN PATENT DOCUMENTS

| JP | 7-121009 A | 5/1995 |
| JP | 9-6152 A | 1/1997 |
| JP | 2004-109688 A | 4/2004 |
| JP | 2005-281497 A | 10/2005 |
| JP | 2006-267244 A | 10/2006 |
| JP | 2007-316160 A | 12/2007 |
| JP | 2009-237359 A | 10/2009 |
| JP | 2010-8878 A | 1/2010 |
| JP | 2010-150356 A | 7/2010 |

OTHER PUBLICATIONS

Machine translation of JP 2005-281497A, Oct. 2005.*
International Preliminary Report on Patentability, International Application No. PCT/JP2012/001525, Mailing Date Oct. 10, 2013.
Tsuru, et al., U.S. Appl. No. 13/572,303, filed Aug. 10, 2012.
European Search Report dated Sep. 1, 2014 in European Application No. 12763790.8.
Chinese Office Action dated May 4, 2015 in Chinese Application No. 201280016898.0.

* cited by examiner

*Primary Examiner* — Ramsey Zacharia
(74) *Attorney, Agent, or Firm* — Fitzpatrick, Cella, Harper and Scinto

(57) ABSTRACT

Provided is an electro-conductive member for electrophotography that stably shows high electro-conductivity even under a low-temperature, low-humidity environment. The electro-conductive member for electrophotography has an electro-conductive mandrel and an electro-conductive layer. The electro-conductive layer contains an ionic electro-conductive resin and an ion carrier. The ionic electro-conductive resin has at least one structure selected from the group consisting of structures represented by the following formulae (1), (2), (3), and (4), and a structure represented by the following formula (5) (in the formula (1) to the formula (5), $R_1$, $R_2$, $R_3$, and $R_4$ each represent a divalent organic group, $X_1$, $X_2$, $X_3$, and $X_4$ each independently represent a sulfonic group or a quaternary ammonium base, and l represents an integer of 1 or more and 23 or less).

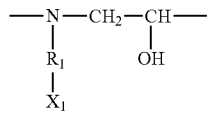  (1)

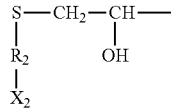  (2)

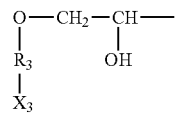  (3)

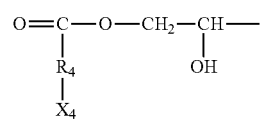  (4)

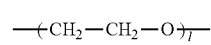  (5)

9 Claims, 4 Drawing Sheets

IONIC ELECTRO-CONDUCTIVE RESIN AND ELECTRO-CONDUCTIVE MEMBER FOR ELECTROPHOTOGRAPHY

CROSS-REFERENCE TO RELATED APPLICATIONS

This application is a continuation of International Application No. PCT/JP2012/001525, filed Mar. 6, 2012, which claims the benefit of Japanese Patent Application Nos. 2011-074975, filed Mar. 30, 2012, and 2012-036566, filed Feb. 22, 2012.

BACKGROUND OF THE INVENTION

1. Field of the Invention

The present invention relates to an ionic electro-conductive resin and an electro-conductive member for electrophotography.

2. Description of the Related Art

In an electrophotographic apparatus, an ionic electro-conductive agent such as a quaternary ammonium salt is added to the electro-conductive layer of a charging roller, which is placed to abut on an electrophotographic photosensitive member and charges the electrophotographic photosensitive member, for adjusting the electro-conductivity of the electro-conductive layer.

However, the environmental stability of the electrical resistance value of the electro-conductive layer whose electro-conductivity has been adjusted with the ionic electro-conductive agent largely depends on the water capacity of the electro-conductive layer. Here, the water capacity of the electro-conductive layer refers to the amount of water molecules in the electro-conductive layer. Particularly under a low-temperature, low-humidity environment, specifically, for example, under an environment having a temperature of 15° C. and a humidity of 10% RH, the water capacity of the electro-conductive layer reduces and hence the electrical resistance of the charging roller increases. When such charging roller is used in the formation of an electrophotographic image and a high-definition electrophotographic image is output at high speed, a defect such as a streak is liable to occur in the electrophotographic image to be obtained.

To cope with such problem, Japanese Patent Application Laid-Open No. 2009-237359 discloses an approach to stabilizing an ion carrier in a polymer with an epoxy compound having an alkylene oxide structure and a curing agent.

In addition, Japanese Patent Application Laid-Open No. H07-121009 discloses an approach involving introducing a hydroxyl group into a polymer with a vinyl monomer having the hydroxyl group to increase a hydration amount. It should be noted that the hydration amount refers to the amount of water molecules held on the periphery of an ion exchange group.

In the approach of Japanese Patent Application Laid-Open No. 2009-237359, the alkylene oxide structure forms a coordination bond with the ion carrier or an ion exchange group by virtue of a lone pair of electrons which an oxygen atom has, thereby exerting a suppressing effect on the recombination of the ion exchange group and the ion carrier. In addition, the lone pair of electrons and a water molecule electrically attract each other, and hence the water capacity in the electro-conductive layer can be maintained. However, the coordination bond has a small binding energy. Accordingly, with the alkylene oxide structure alone, a water molecule evaporates from the electro-conductive layer in a low-temperature, low-humidity environment. Therefore, when an application to the charging roller is taken into consideration, it is difficult to obtain sufficient electro-conductivity in the low-temperature, low-humidity environment merely by introducing the alkylene oxide structure into the structure of the electro-conductive layer. By the foregoing reason, in the structure of Japanese Patent Application Laid-Open No. 2009-237359, an ionic electro-conductive agent is added for obtaining an electrical resistance value in a moderate resistance region needed for the charging roller even in the low-temperature, low-humidity environment. However, the addition of the ionic electro-conductive agent leads to the movement of the ionic electro-conductive agent in the electro-conductive layer, thereby causing the contamination of the photosensitive member due to bleeding or blooming.

In addition, in the approach of Japanese Patent Application Laid-Open No. H07-121009, the hydroxyl group is introduced into the polymer to increase the hydration amount on the periphery of the ion exchange group. Thus, the water capacity in the electro-conductive layer in a low-temperature, low-humidity environment can be increased. According to investigations conducted by the inventors of the present invention and the like, however, upon high-speed output of a high-definition image in the low-temperature, low-humidity environment, a variation in electrical resistance value of the entire charging roller occurs owing to the insufficiency of the hydration amount on the periphery of the hydroxyl group. As a result, an image failure such as a charging horizontal streak or a sandy image is caused in some cases. Thus, the inventors have acknowledged that the approach still has room for improvement.

SUMMARY OF THE INVENTION

In view of the foregoing, the present invention is directed to providing an electro-conductive member for electrophotography that stably shows high electro-conductivity even in a low-temperature, low-humidity environment. Further, the present invention is directed to providing an electrophotographic apparatus and a process cartridge capable of stably forming high-quality electrophotographic images under various environments. Still further, the present invention is directed to providing an ionic electro-conductive resin that shows high electro-conductivity even under a low-temperature, low-humidity environment.

According to one aspect of the present invention, there is provided an electro-conductive member for electrophotography, comprising: an electro-conductive mandrel; and an electro-conductive layer, wherein: the electro-conductive layer comprises an ionic electro-conductive resin and an ion carrier; and the ionic electro-conductive resin has at least one structure selected from the group consisting of structures represented by the following formulae (1), (2), (3), and (4), and a structure represented by the following formula (5).

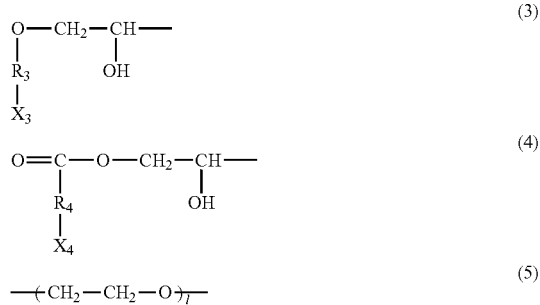

(In the formula (1) to the formula (5), $R_1$, $R_2$, $R_3$, and $R_4$ each represent a divalent organic group, $X_1$, $X_2$, $X_3$, and $X_4$ each independently represent a sulfonic group or a quaternary ammonium base, and 1 represents an integer of 1 or more and 23 or less.)

According to another aspect of the present invention, there is provided an electrophotographic apparatus, comprising: a charging member; and a developing member, wherein one, or each of both, of the charging member and the developing member comprises the above-described electro-conductive member for electrophotography. According to further aspect of the present invention, there is provided a process cartridge, comprising: an electrophotographic photosensitive member; and one or both selected from a charging member and a developing member, wherein the process cartridge is detachably mountable to a main body of an electrophotographic apparatus. According to still further aspect of the present invention, there is provided an ionic electro-conductive resin, comprising; at least one structure selected from the group consisting of structures represented by the formulae (1), (2), (3), and (4), and a structure represented by the formula (5).

According to the present invention, there is provided the electro-conductive member for electrophotography that stably shows high electro-conductivity even in a low-temperature, low-humidity environment. In addition, according to the present invention, provided are an electrophotographic apparatus and a process cartridge which contribute to the stable formation of high-quality electrophotographic images under various environments. Further, according to the present invention, provided is an ionic electro-conductive resin that shows sufficient electro-conductivity even under a low-temperature, low-humidity environment.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

(First Embodiment)

An electro-conductive member for electrophotography related to the present invention can be used as each of a charging member, a developing member, a transferring member, an antistatic member, and a conveying member such as a sheet-feeding roller in an electrophotographic image forming apparatus. Now, the present invention is described by way of a charging roller as a representative example of the electro-conductive member for electrophotography.

Figure 1A:
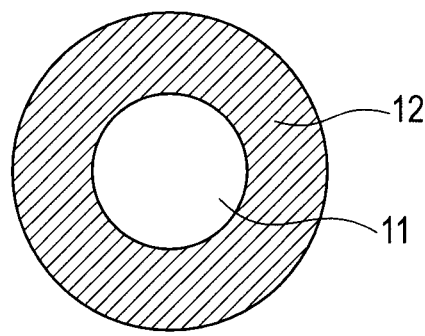
FIG. 1A is a schematic construction view of a charging roller according to the present invention.
Figure 1B:
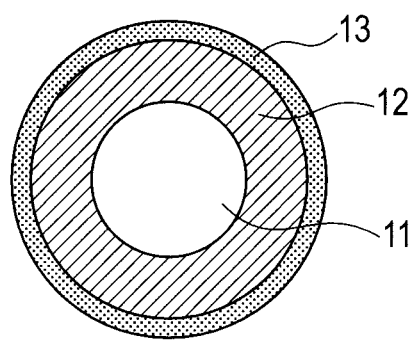
FIG. 1B is a schematic construction view of the charging roller according to the present invention.
Figure 1C:
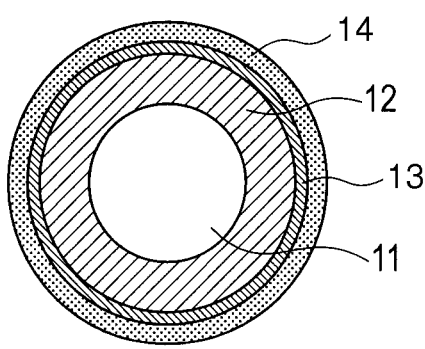
FIG. 1C is a schematic construction view of the charging roller according to the present invention.

FIGS. 1A to 1C are each a schematic construction view of a roller-shaped charging member (hereinafter, sometimes referred to as "charging roller") according to the present invention. As illustrated in FIG. 1A, a first electro-conductive layer 12 is provided on the outer periphery of an electro-conductive mandrel 11. In this case, the first electro-conductive layer 12 contains an ionic electro-conductive resin of the present invention. As illustrated in FIG. 1B, a second electro-conductive layer 13 may be provided on the outer periphery of the first electro-conductive layer 12. Further, as illustrated in FIG. 1C, an outermost layer 14 may be provided to such an extent that an effect of the present invention is not impaired. When multiple electro-conductive layers are provided, any one, or each of all, of the layers has only to contain the ionic electro-conductive resin of the present invention.

(Electro-Conductive Mandrel)

The electro-conductive mandrel 11 has electro-conductivity for feeding the surface of the charging roller through the mandrel.

(Electro-conductive Layer Containing Ionic Electro-Conductive Resin)

Now, an electro-conductive layer containing the ionic electro-conductive resin is described in detail.

<Ionic Electro-conductive Resin>

In order that the ionic electro-conductive resin may express ionic conduction, first, ionic dissociation, i.e., the ionization of a cation and an anion by an ion exchange group needs to be caused. To this end, in ordinary cases, an electrolyte is dissolved in a polar solvent so that a state where an ion carrier to be produced (a cation or an anion) can exist alone may be established. Then, a state where the ion carrier can stably move without recombining with the ion exchange group again must be established. In the polar solvent, the stabilization of the ion carrier by a solvent molecule is performed.

On the other hand, in the case of the ionic electro-conductive resin constituting the electro-conductive layer of the electro-conductive member for electrophotography, the dissociation of an ion and the movement of the ion need to be caused in a solid ionic electro-conductive resin. In other words, the structure of the ionic electro-conductive resin needs to have a structure having an ionic dissociation action that replaces the polar solvent and a structure for stabilizing an ion carrier.

<<Structure Having Ionic Dissociation Action>>

In order that the ionic dissociation may be caused in the ionic electro-conductive resin in a solid, there may be a need to increase a hydration amount in the ionic electro-conductive resin for providing an affinity between an ion exchange group and a molecule that replaces the polar solvent. Examples of the ion exchange group include a sulfonic group, a carboxylic acid group, a phosphate group, a phosphonic acid group, a phosphonous acid group, and a quaternary ammonium base.

In addition, in the present invention, the ion exchange group needs to be one of a sulfonic group and a quaternary ammonium base because each of the groups has high ionic dissociation property and can reduce the resistance of the resin even when its addition amount is small.

In addition, the ion exchange group is preferably introduced in such an amount that the volume resistivity of the ionic electro-conductive resin falls within a moderate resistance region (the volume resistivity is $1\times10^2$ Ω·cm to $1\times10^{11}$ Ω·cm). Further, it has been known that the ionic electro-conductive resin that shows its ionic electro-conductivity through the ionic dissociation of a sulfonic group or a quaternary ammonium base obtains sufficient electro-conductive performance in a state where water molecules sufficiently exist.

In other words, in order that the ionic electro-conductivity of the ionic electro-conductive resin may be retained in the solid, a water capacity in the ionic electro-conductive resin may be an important factor. However, the water capacity in the ionic electro-conductive resin largely depends on the environment thereof and hence it has been difficult to obtain sufficient electro-conductivity in a low-temperature, low-humidity environment in some cases.

In view of the foregoing, the inventors of the present invention have attempted to perform, as means for solving the problem, such molecular design that even when the ionic electro-conductive resin is exposed to a low-humidity environment, a hydration amount on the periphery of the ion exchange group in the ionic electro-conductive resin is maintained.

That is, in order that the hydration amount on the periphery of the ion exchange group may be increased with a hydroxyl group, it may be preferred that the ion exchange group and the hydroxyl group be as close to each other as possible. However, when the ion exchange group and the hydroxyl group are positioned so as to be extremely close to each other and a hydrogen bond having a large binding energy is formed between both the groups, the ionic dissociation action of the ion exchange group is lost and hence it is assumed that the ionic electro-conductivity can no longer be obtained.

On the other hand, when a distance between the ion exchange group and the hydroxyl group enlarges, the hydration amount on the periphery of the ion exchange group cannot be increased even when the water capacity of the entire ionic electro-conductive resin increases by virtue of the presence of the hydroxyl group. Accordingly, an improving effect on the ionic electro-conductivity is assumed to be low.

In view of the foregoing, the inventors of the present invention have conducted an investigation on an ionic electro-conductive resin containing at least one structure selected from the group consisting of structures represented by the following formula (1) to the following formula (4) with a view to optimizing the positions of the ion exchange group and the hydroxyl group on the basis of a relationship between a bond distance in a covalent bond (a carbon-carbon distance is about 0.15 nm, a carbon-nitrogen distance is about 0.146 nm, a carbon-oxygen distance is about 0.148 nm, and a hydrogen-oxygen distance is about 0.095 nm) and a bond distance in a hydrogen bond (a hydrogen-oxygen distance is about 0.272 nm).

As a result, the inventors have found that the electrical resistance value of the ionic electro-conductive resin having, in a molecule thereof, at least one structure selected from the group consisting of the structures represented by the following formula (1) to the following formula (4) hardly increases even under a low-humidity environment.

That is, in the case of the ionic electro-conductive resin having, in a molecule thereof, at least one structure selected from the group consisting of the structures represented by the following formulae (1), (2), (3), and (4), a hydroxyl group forms a hydrogen bond with a water molecule in the ionic electro-conductive resin and hence the water capacity of the ionic electro-conductive resin itself increases. In addition, its ion exchange group is placed in the vicinity of the hydroxyl group and hence a hydration amount on the periphery of the ion exchange group synergistically increases. As a result, the ionic electro-conductive resin may sufficiently obtain ionic conduction even in a low-temperature, low-humidity environment.

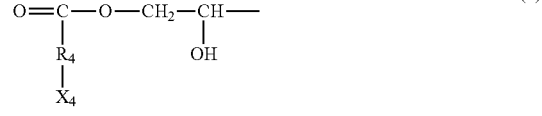

In the formula (1) to the formula (4), $R_1$, $R_2$, $R_3$, and $R_4$ each represent a divalent organic group, and $X_1$, $X_2$, $X_3$, and $X_4$ each independently represent a sulfonic group or a quaternary ammonium base.

In addition, out of the formulae (1) to (4), the structure represented by the formula (1) is particularly preferred. This is because the strongest hydrogen bond can be formed between a lone pair of electrons and a water molecule among the formulae (1) to (4) in the structure of the ionic electro-conductive resin from the viewpoint of the water capacity in the ionic electro-conductive resin.

<<Structure for Stabilizing Ion Carrier>>

In order that the ion carrier that has dissociated from the ion exchange group may sufficiently contribute to the ionic electro-conductivity of the electro-conductive layer, it is important for the ion carrier not to recombine with the ion exchange group which the ionic electro-conductive resin has again during its movement in the electro-conductive layer. To this end, a structure for stabilizing the ion carrier needs to be introduced into the ionic electro-conductive resin.

In the present invention, it is important that an ethylene oxide structure represented by the following formula (5) be introduced as the structure for stabilizing the ion carrier into the ionic electro-conductive resin. The ethylene oxide structure can stabilize the ion carrier with an ether bond present in its molecular structure. Further, the ethylene oxide structure has a polar band resulting from an oxygen atom in its molecular structure and hence has a strong interaction with a cation. Accordingly, the ion carrier responsible for the ionic electro-conductivity may be stabilized to a larger extent when the ion carrier is a cation rather than an anion.

(In the formula (5), l represents an integer of 1 or more and 23 or less.)

The ethylene oxide structure for stabilizing the ion carrier is preferably present in the vicinity of the ion exchange group because the ionic electro-conductive resin according to the present invention needs to have sufficient electro-conductivity even under a low-temperature, low-humidity environment. In addition, its bonding mode is preferably a structure represented by the following formula (6) present at each of both ends of the structure having the ion exchange group in order that the ion carrier may be stabilized. In consideration of an increase in resistance of the resin due to the crystallization of the ethylene oxide structure, it is preferred that n in the structure represented by the following formula (6) represent an integer of 1 or more and 23 or less and m in the structure represent an integer of 1 or more and 18 or less. By the same reason, it is particularly desirable that n represent an integer of 1 or more and 4 or less and m represent an integer of 1 or more and 4 or less.

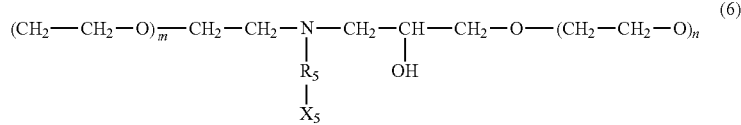

In the formula (6), $R_5$ represents a divalent organic group, $X_5$ represents a sulfonic group or a quaternary ammonium base, m represents an integer of 1 or more and 18 or less, and n represents an integer of 1 or more and 23 or less.

Meanwhile, the ion exchange group in each of the structures represented by $X_1$, $X_2$, $X_3$, $X_4$, and $X_5$ in the formulae may be preferably as close to a hydroxyl group as possible to such an extent that no hydrogen bond is formed in consideration of the stabilization of the ion exchange group with the hydroxyl group and an increase in hydration amount on the periphery of the ion exchange group.

The ion exchange group is preferably a sulfonic group that allows a cation to serve as a carrier in consideration of an interaction with ethylene oxide. Further, the group is more preferably bonded through an alkyl group having electron-donating property in order that the ionic dissociation property of the sulfonic group may be improved. Therefore, the resin preferably has such a structure that in the formula (6), $R_5$ represents a methylene group and $X_5$ represents a sulfonic group.

<Method of Producing Ionic Electro-conductive Resin>

A method involving mixing a main agent, a curing agent, and an ionic electro-conductive agent into a solvent and curing the mixture can be given as an example of a method of producing the ionic electro-conductive resin having the ion exchange group according to the present invention, provided that the production method is not limited to the method involving using the combination of raw materials.

<<Main Agent>>

As the main agent according to the present invention, an epoxy compound having two or more glycidyl groups may be used, for example. An epoxy compound containing ethylene oxide in its structure is, for example, alkanediol diglycidyl ether, polyalkylene diglycidyl ether, alkyl diglycidyl ether, or diglycidyl ether of a (polypropylene oxide-polyethylene oxide-polypropylene oxide) block copolymer. It should be noted that one kind of the compounds may be used alone, or multiple kinds thereof may be used. On the other hand, when using an epoxy compound not having an ethylene oxide structure, a curing agent having an ethylene oxide structure must be used. In this case, adipic acid may be used, for example.

Especially, polyethylene glycol diglycidyl ether having an ethylene oxide structure which is effective in stabilizing ion carriers, is preferably used. Most preferably, ethylene glycol diglycidyl ether which is less affected by the increase in resistance of the resin due to the crystallization of the ethylene oxide is used. Further, ethylene glycol diglycidyl ether has a boiling point of 110° C., which is lower than the heat curing temperature of the ionic electro-conductive resin. Accordingly, even when an unreacted product not bonded to the ionic electro-conductive resin through a covalent bond, the unreacted product being responsible for bleeding, blooming, or the like, exists, the unreacted product can be easily removed in a heat curing process.

<<Curing Agent>>

Examples of the curing agent according to the present invention include amines, acid anhydrides, polyhydric phenols, thiols, and alcohols. In the present invention, it may be preferred that any one of the amines be used because of the following reasons. In the structure of the ionic electro-conductive resin, the lone pair of electrons and a water molecule electrically attract each other to increase the hydration amount in the resin. Further, the amine serves as a crosslinking point to form a network structure, and hence more water molecules can be held in the ionic electro-conductive resin. In particular, amines having ethylene oxide structures are each preferably used in order that electro-conductivity may be secured. Examples of the amines having ethylene oxide structures include polyalkylene glycol bis-2-aminoethylether and bis-2-aminoethylether of a (polypropylene oxide-polyethylene oxide-polypropylene oxide) block copolymer. More preferably, for obtaining sufficient electro-conductivity, polyethylene glycol bis-2-aminoethylether is used. Of those, ethylene glycol bis-2-aminoethylether is most preferred in consideration of the crystallization of the ethylene oxide structure. One kind of the compounds may be used alone, or multiple kinds thereof may be used. It should be noted that when any one of the thiols and the acid anhydrides is used as a curing agent, an alkaline compound formed of imidazole and an amine, and derivatives thereof is desirably used in a small amount as a curing accelerator. In addition, at the time of the curing reaction, the curing reaction is preferably accelerated through heating to such an extent that the effect of the present invention is not impaired.

In addition, the compounding amount of the curing agent is preferably set within the range of 1 part by mass to 1,000 parts by mass with respect to 100 parts by mass of the main agent. The compounding amount is more preferably set within the range of 2 parts by mass to 150 parts by mass. In addition, when the curing accelerator is used, the compounding amount of the curing accelerator with respect to the main agent is preferably set within the range of 0.01 part by mass to 20 parts by mass with respect to 100 parts by mass of the epoxy compound. The compounding amount is more preferably set within the range of 0.1 part by mass to 10 parts by mass. That is because of the following reasons. When the compounding amount of each of the curing agent and the curing accelerator falls short of the specified range, the heat curing is not sufficiently performed. In contrast, when the compounding amount of each of the curing agent and the curing accelerator exceeds the specified range, an unreacted product of each of the curing agent and the curing accelerator bleeds.

<<Ionic Electro-conductive Agent>>

An ionic electro-conductive agent as a raw material is formed of a reactive functional group that reacts with the main agent or the curing agent, an ion exchange group that is one of a quaternary ammonium base and a sulfonic group, and a carrier molecule as a counter ion for the group. It should be noted that examples of the reactive functional group include halogen atoms (fluorine, chlorine, bromine, and iodine atoms), acid groups such as a carboxyl group and an acid anhydride, and functional groups such as a hydroxyl group, an amino group, a mercapto group, an alkoxy group, a vinyl group, a glycidyl group, an epoxy group, a nitrile group, and a carbamoyl group, and any one of the groups may be used as long as the group reacts with the main agent or the curing agent.

The addition amount of the ionic electro-conductive agent according to the present invention can be appropriately set, and the ionic electro-conductive agent is preferably compounded at a ratio of 0.5 part by mass or more and 20 parts by mass or less with respect to 100 parts by mass of the main agent. When the compounding amount is 0.5 part by mass or more, an electro-conductivity-imparting effect by the addition of the electro-conductive agent can be easily obtained. When the compounding amount is 20 parts by mass or less, the environment dependence of the electrical resistance can be reduced.

<<Solvent>>

Isopropyl alcohol (hereinafter, sometimes referred to as "IPA") is preferably used as the solvent according to the present invention when the curing agent is any one of the amines, the alcohols, and the thiols. On the other hand, when any one of the acid anhydrides is used as the curing agent, an ether-based solvent or a ketone-based solvent needs to be used in order that a reaction between the solvent and the curing agent may be prevented. Examples of the solvent include toluene, benzene, methyl ethyl ketone, and methyl isopropyl butyl ketone.

The compounding amount of the solvent according to the present invention can be appropriately set to such an extent that the effect of the invention is not impaired. The compounding amount is preferably such that raw materials such as the main agent, the curing agent, and the ionic electro-conductive agent can be properly mixed.

<<Any Other Component>>

A filler, a softening agent, a processing aid, a tackifier, an anti-adhesion agent, a dispersant, and a foaming agent which have been generally used as resin compounding agents can each be added to the ionic electro-conductive resin to such an extent that the effect of the present invention is not impaired.

(Construction of Electro-Conductive Roller)

When the ionic electro-conductive resin of the present invention is used as the second electro-conductive layer 13 as illustrated in FIG. 1B, a rubber component for forming the first electro-conductive layer 12 is not particularly limited and a rubber known in the field of an electro-conductive member for electrophotography can be used. Specifically, for example, an ethylene-propylene-diene copolymer, a styrene-butadiene copolymerized rubber (SBR), a silicone rubber, an isoprene rubber (IR), a butyl rubber (BR), a chloroprene rubber (CR), an epichlorohydrin homopolymer, an epichlorohydrin-ethylene oxide copolymer, an epichlorohydrin-ethylene oxide-allyl glycidyl ether terpolymer, an acrylonitrile-butadiene copolymer, a hydrogenated product of an acrylonitrile-butadiene copolymer, a carboxylated acrylonitrile-butadiene copolymer such as an acrylonitrile-butadiene-methacrylic acid copolymer, an acrylic rubber, a urethane rubber, a diene-based rubber, a silicone rubber, a polysulfide rubber, and the like may be used. Those rubber materials may be used alone or in combination of two or more. As a material of the charging roller, considering the availability of an electrical resistance value in a moderate resistance region in the case where an ionic electro-conductive agent and an electron conductive agent are dispersed, an epichlorohydrin-ethylene oxide-allyl glycidyl ether terpolymer or an acrylonitrile-butadiene copolymer is preferred. As a material of the developing member, considering the compression set resistance, a silicone rubber or a urethane rubber is preferred.

When the ionic electro-conductive resin of the present invention is used as the first electro-conductive layer 12 as illustrated in FIG. 1B, a known resin in the field of an electro-conductive member for electrophotography can be used for the second electro-conductive layer 13. Specific examples include an acrylic resin, a polyurethane, a polyamide, a polyester, a polyolefin, and a silicone resin. For a resin forming the second electro-conductive layer 13, as needed, carbon black, graphite, a conductive metal oxide obtained by subjecting tin oxide, zinc oxide, indium oxide, titanium oxide, a tin oxide-antimony oxide solid solution, a tin oxide-indium oxide solid solution, or the like to a conductive treatment, various conductive metals or alloys such as aluminum, copper, tin, and stainless steel, fine powder of an insulating material covered with those conductive materials, an ionic electro-conductive agent having ion exchange performance such as a quaternary ammonium salt, and a non-conductive filler such as diatomaceous earth, quartz powder, dry silica, wet silica, titanium oxide, zinc oxide, aluminosilicate, or calcium carbonate are added.

It should be noted that the outermost layer 14 as a protective layer may be provided on the outer periphery of the second electro-conductive layer 13 as illustrated in FIG. 1C to such an extent that the effect of the invention is not impaired.

(Electrophotographic Apparatus)

Figure 2:
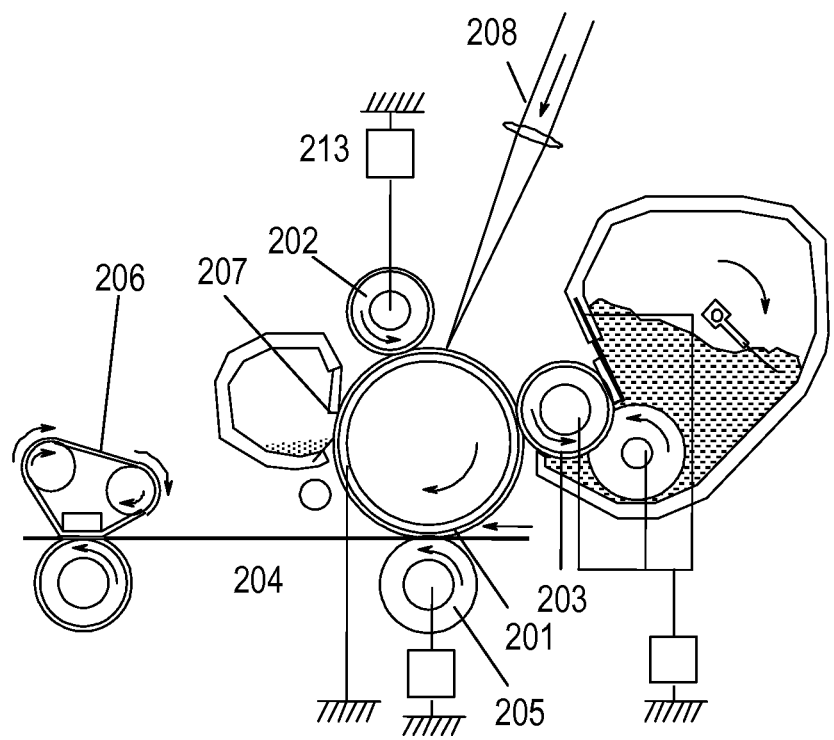
FIG. 2 is a schematic view of an electrophotographic image forming apparatus.

FIG. 2 is a schematic view of an electrophotographic apparatus according to the present invention. The apparatus is constructed of constituent members such as: a charging roller 202 for charging an electrophotographic photosensitive member 201; a latent image forming apparatus (not shown) for performing exposure; a developing apparatus 203 for developing a latent image into a toner image; a transferring apparatus 205 for transferring the toner image onto a transfer material 204; a cleaning apparatus 207 for recovering transfer residual toner on the electrophotographic photosensitive member; and a fixing apparatus 206 for fixing the toner image. The electrophotographic photosensitive member 201 is of a rotating drum type having a photosensitive layer on an electro-conductive substrate. The electrophotographic photosensitive member 201 is rotationally driven in the direction indicated by an arrow at a predetermined peripheral speed (process speed). The charging roller 202 is placed to contact the electrophotographic photosensitive member 201 by being pressed against the member with a predetermined force. The charging roller 202 rotates in accordance with the rotation of the electrophotographic photosensitive member 201, and charges the electrophotographic photosensitive member 201 to a predetermined potential through the application of a predetermined DC voltage from a power source 213 for charging. An exposing apparatus such as a laser beam scanner is used as the latent image forming apparatus for forming a latent image on the electrophotographic photosensitive member 201.

The electrophotographic photosensitive member 201 that has been uniformly charged is irradiated with exposure light 208 modulated in correspondence with image information. Thus, an electrostatic latent image is formed. The developing apparatus 203 has a roller-shaped developing member ((hereinafter, sometimes referred to as "developing roller") provided to contact the electrophotographic photosensitive member 201. The electrostatic latent image is visualized and developed into a toner image with toner, which has been subjected to an electrostatic treatment to have the same polarity as the charged polarity of the photosensitive member, by reversal development. The transferring apparatus 205 has a contact-type transfer roller. The apparatus transfers the toner image from the electrophotographic photosensitive member 201 to the transfer material 204 such as plain paper. It should be noted that the transfer material 204 is conveyed by a sheet-feeding system having a conveying member. The cleaning apparatus 207 has a blade-type cleaning member and a recovery container, and mechanically scrapes off and recovers the transfer residual toner remaining on the electrophotographic photosensitive member 201 after the transfer. Here, the cleaning apparatus 207 can be removed by adopting such a simultaneous-with-development cleaning mode that the transfer residual toner is recovered in the developing apparatus 203. The fixing apparatus 206 is constructed of a member such as a heated roll. The fixing apparatus 206 fixes the transferred toner image on the transfer material 204 and then discharges the resultant to the outside of the apparatus.

In addition, the electrophotographic apparatus according to the present invention is obtained by using the electro-conductive member for electrophotography according to the present invention in one, or each of both, of the charging member placed to contact the electrophotographic photosensitive member and the developing member placed to contact the electrophotographic photosensitive member.

(Process Cartridge)

Figure 3:
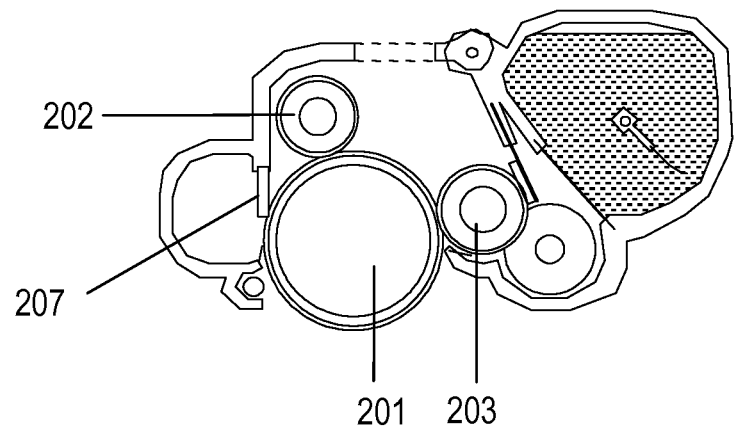
FIG. 3 is a schematic view of a process cartridge.

FIG. 3 is a schematic sectional view of a process cartridge. The process cartridge illustrated in FIG. 3 includes the electrophotographic photosensitive member 201, the charging roller 202 placed to contact the electrophotographic photosensitive member 201, the developing roller 203 placed to contact the electrophotographic photosensitive member 201, and the cleaning apparatus 207, and The process cartridge is detachably mountable to the main body of the electrophotographic apparatus. In addition, the process cartridge according to the present invention is obtained by using the electro-conductive member for electrophotography according to the present invention in one, or each of both, of the developing roller 202 and the charging roller 203.

(Second Embodiment)

A second embodiment of the present invention is an electrolyte membrane for a fuel cell.

A membrane-electrode assembly can be produced by placing electrodes on the ionic electro-conductive resin according to the present invention. The membrane-electrode assembly is constructed of the ionic electro-conductive resin according to the present invention, and catalyst electrodes (an anode and a cathode) opposed to each other across the resin. The catalyst electrodes are each obtained by forming a catalyst layer on a gas diffusion layer. A method of producing the assembly is not particularly limited and a known technology can be employed. The assembly can be produced by a method such as a method involving directly forming, on the ionic electro-conductive resin, a gas diffusion electrode using a catalyst obtained by dispersing and carrying platinum, a platinum-ruthenium alloy, or fine particles thereof on a carrier such as carbon, a method involving hot-pressing the gas diffusion electrode and the ionic electro-conductive resin, or a method involving bonding the electrode and the resin with a contacting liquid.

In addition, a fuel cell can be produced with the ionic electro-conductive resin according to the present invention or the membrane-electrode assembly by a known approach. The construction of the fuel cell is, for example, a construction including the membrane-electrode assembly, a pair of separators between which the membrane-electrode assembly is interposed, a collector attached to each of the separators, and a packing. A separator on an anode electrode side is provided with an anode electrode side opening portion through which gas fuels or liquid fuels of hydrogen or alcohols such as methanol are supplied. Meanwhile, a separator on a cathode electrode side is provided with a cathode electrode side opening portion through which an oxidant gas such as an oxygen gas or air is supplied.

Now, the present invention is specifically described by way of examples.

1. Preparation of Coating Liquid;

<Preparation of Coating Liquids Nos. 1 to 44>

A main agent, a curing agent, and an ionic electro-conductive agent shown in Table 1-1 to Table 1-3 were mixed in such a combination and compounding amounts as shown in Table 2 into a solvent whose amount was also shown in Table 2, and then the mixture was sufficiently stirred in the air at room temperature. Thus, coating liquids Nos. 1 to 44 were obtained.

TABLE 1-1

| Main agent | Compound name |
|---|---|
| A | Ethylene glycol diglycidyl ether |
| B | Tetraethylene glycol diglycidyl ether |
| C | Tricosaethylene glycol diglycidyl ether |
| D | Propylene glycol diglycidyl ether |
| E | Bisphenol A |
| F | Diglycidyl ether of (propylene oxide/ethylene oxide/propylene oxide) block copolymer |
| G | Adipic acid |
| H | Nonaethylene glycol diglycidyl ether |

TABLE 1-2

| Curing agent | Compound name |
|---|---|
| A | Ethylene glycol bis-2-aminoethylether |
| B | Octadecaethylene glycol bis-2-aminoethylether |
| C | Propylene glycol bis-2-aminoethylether |
| D | Ethylenediamine |
| E | Bis-2-aminoethylether of (propylene oxide/ethylene oxide/propylene oxide) block copolymer |
| F | Phthalic anhydride |
| G | Trimellitic anhydride |
| H | Tetraethylene glycol bis(3-mercaptopropionate) |
| I | Pentaerythritol tetrakis(3-mercaptopropionate) |
| J | Bisphenol A |

TABLE 1-3

| Ionic electro-conductive agent | Compound name |
|---|---|
| A | Chloromethylsulfonic acid |
| B | 4-Aminomethylbenzenesulfonic acid |
| C | Glycidyltrimethylammonium chloride |
| D | Tetraethylammonium chloride |

TABLE 2

| Coating liquid No. | Main agent Kind | Main agent Compounding amount (g) | Curing agent Kind | Curing agent Compounding amount (g) | Ionic electro-conductive agent Kind | Ionic electro-conductive agent Compounding amount (g) | Solvent Kind | Solvent Compounding amount (g) |
|---|---|---|---|---|---|---|---|---|
| 1 | A | 4.96 | A | 3.29 | A | 0.17 | IPA | 10 |
| 2 | A | 4.96 | B | 19.92 | A | 0.50 | IPA | 10 |
| 3 | A | 4.96 | C | 8.88 | A | 0.28 | IPA | 10 |
| 4 | A | 4.96 | D | 1.33 | A | 0.13 | IPA | 10 |
| 5 | A | 4.96 | E | 44.4 | A | 0.99 | IPA | 10 |
| 6 | B | 8.73 | A | 3.29 | A | 0.24 | IPA | 10 |
| 7 | B | 8.73 | C | 8.88 | A | 0.35 | IPA | 10 |
| 8 | C | 32.55 | A | 3.29 | A | 0.72 | IPA | 10 |
| 9 | C | 32.55 | C | 8.88 | A | 0.83 | IPA | 10 |
| 10 | D | 5.36 | A | 3.29 | A | 0.17 | IPA | 10 |
| 11 | D | 5.36 | B | 19.92 | A | 0.51 | IPA | 10 |
| 12 | E | 8.9 | A | 3.29 | A | 0.24 | IPA | 10 |
| 13 | F | 51.6 | A | 3.29 | A | 1.10 | IPA | 10 |
| 14 | F | 51.6 | E | 44.4 | A | 1.92 | IPA | 10 |
| 15 | A | 4.96 | A | 3.29 | B | 0.17 | IPA | 10 |
| 16 | A | 4.96 | C | 8.88 | B | 0.28 | IPA | 10 |
| 17 | B | 8.73 | A | 3.29 | B | 0.24 | IPA | 10 |
| 18 | B | 8.73 | C | 8.88 | B | 0.35 | IPA | 10 |
| 19 | F | 8.27 | C | 8.88 | B | 0.34 | IPA | 10 |
| 20 | D | 5.36 | A | 3.29 | B | 0.17 | IPA | 10 |
| 21 | F | 51.6 | A | 3.29 | B | 1.10 | IPA | 10 |
| 22 | A | 4.96 | A | 3.29 | C | 0.17 | IPA | 10 |
| 23 | A | 4.96 | C | 8.88 | C | 0.28 | IPA | 10 |
| 24 | B | 8.73 | A | 3.29 | C | 0.24 | IPA | 10 |
| 25 | B | 8.73 | C | 8.88 | C | 0.35 | IPA | 10 |
| 26 | C | 32.55 | C | 8.88 | C | 0.83 | IPA | 10 |
| 27 | D | 5.36 | A | 3.29 | C | 0.17 | IPA | 10 |
| 28 | F | 8.27 | A | 3.29 | C | 0.23 | IPA | 10 |
| 29 | A | 4.96 | F | 3.29 | A | 0.17 | Toluene | 10 |
| 30 | A | 4.75 | G | 4.27 | A | 0.18 | Toluene | 10 |
| 31 | F | 51.6 | F | 3.29 | A | 1.10 | Toluene | 10 |
| 32 | F | 77.4 | G | 4.27 | A | 1.63 | Toluene | 10 |
| 33 | A | 4.96 | H | 8.26 | A | 0.26 | IPA | 10 |
| 34 | A | 4.96 | I | 10.85 | A | 0.32 | IPA | 10 |
| 35 | F | 51.6 | H | 8.26 | A | 1.20 | IPA | 10 |
| 36 | F | 51.6 | I | 10.85 | A | 1.25 | IPA | 10 |
| 37 | A | 4.96 | J | 5.06 | A | 0.20 | IPA | 10 |
| 38 | F | 51.6 | J | 5.06 | A | 1.13 | IPA | 10 |
| 39 | A | 2.98 | A | 3.29 | A | 0.18 | IPA | 10 |
| 40 | A | 4.96 | A | 1.65 | A | 0.22 | IPA | 10 |
| 41 | H | 277 | A | 67 | A | 6.88 | — | — |
| 42 | D | 5.36 | C | 8.88 | A | 0.36 | IPA | 10 |
| 43 | A | 4.96 | A | 3.29 | D | 0.18 | IPA | 10 |
| 44 | G | 4.16 | A | 3.29 | A | 0.16 | IPA | 10 |

<Preparation of Coating Liquid No. 45>

Monomers were copolymerized in the following compounding amounts: 10 g of 2-hydroxyethyl acrylate, 60 g of methyl methacrylate, and 25 g of a quaternary ammonium base polymer represented by the following formula (7). Thus, an aqueous solution of a copolymer was obtained. Further, 5 g of a glycerol polyglycidyl ether were added to the aqueous solution of the copolymer, and then 0.1 g of 2-methylimidazole as a crosslinking curing agent was added to the mixture. Thus, a coating liquid No. 45 was prepared.

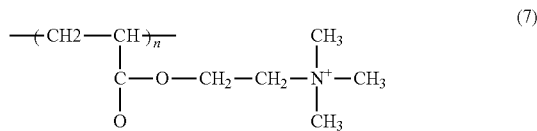

(7)

<Evaluation 1> Evaluation of environment dependence of electrical resistivity of test piece of resin thin film;

The environment dependence of the electrical resistivity of a resin thin film produced from each coating liquid was evaluated by the following method.

(1-1) Production of Test Piece;

Each coating liquid was charged into an aluminum cup, and was then heated at a temperature of 160° C. for 20 minutes to be cured. After that, the cured product was taken out of the aluminum cup, and then a test piece for the measurement of an electrical resistance value was produced. It should be noted that the thickness of the test piece was set to 0.5 mm.

(1-2) Measurement of Electrical Resistance Value of Test Piece;

The test piece prepared in the foregoing was interposed between electrodes with a guide link, and then the resultant was placed under each of an environment having a temperature of 23° C. and a humidity of 50% R.H. (hereinafter, sometimes referred to as "N/N environment") and an environment having a temperature of 15° C. and a humidity of 10% R.H. (hereinafter, sometimes referred to as "L/L environment"). A DC voltage of 200 V was applied to the resultant and its electrical resistance value under each environment was measured. Then, its volume resistivity under each environment was calculated from the resultant electrical resistance value.

In addition, the logarithm of a ratio between the electrical resistance value under the L/L environment and the electrical resistance value under the N/N environment is calculated in order that the environment dependence of the electrical resistivity may be confirmed. The value is defined as an environmental variation digit.

Table 3-1 and Table 3-2 below show the results. In addition, Table 3-1 and Table 3-2 each show a structure which the resin constituting each test piece contains out of the structures (1) to (6) according to the present invention together.

TABLE 3-1

| Number of coating liquid used in production of test piece | Electrical resistivity (MΩcm) | | Environmental variation digit | Structure contained out of formula (1) to formula (6) |
|---|---|---|---|---|
| | L/L environment | N/N environment | | |
| 1 | 2.7 | 6.1 | 0.35 | (1), (5), (6) |
| 2 | 2.5 | 6.1 | 0.38 | (1), (5), (6) |
| 3 | 1.1 | 6.1 | 0.75 | (1), (5) |
| 4 | 0.89 | 6.1 | 0.83 | (1), (5) |
| 5 | 2.4 | 6.1 | 0.41 | (1), (5) |
| 6 | 2.6 | 6.1 | 0.37 | (1), (5), (6) |
| 7 | 1.6 | 6.1 | 0.59 | (1), (5) |
| 8 | 2.4 | 6.1 | 0.40 | (1), (5), (6) |
| 9 | 1.3 | 6.1 | 0.66 | (1), (5) |
| 10 | 1.3 | 6.1 | 0.68 | (1), (5) |
| 11 | 0.97 | 6.1 | 0.79 | (1), (5) |
| 12 | 0.91 | 6.1 | 0.82 | (1), (5) |
| 13 | 2.0 | 6.1 | 0.47 | (1), (5) |
| 14 | 1.9 | 6.1 | 0.51 | (1), (5) |
| 15 | 2.7 | 6.1 | 0.36 | (1), (5), (6) |
| 16 | 1.2 | 6.1 | 0.71 | (1), (5) |
| 17 | 2.6 | 6.1 | 0.37 | (1), (5), (6) |
| 18 | 1.6 | 6.1 | 0.57 | (1), (5) |
| 19 | 1.4 | 6.1 | 0.64 | (1), (5) |
| 20 | 1.3 | 6.1 | 0.66 | (1), (5) |
| 21 | 1.6 | 6.1 | 0.59 | (1), (5) |
| 22 | 2.0 | 6.1 | 0.47 | (1), (5), (6) |
| 23 | 1.0 | 6.1 | 0.77 | (1), (5) |
| 24 | 2.3 | 6.1 | 0.42 | (1), (5), (6) |
| 25 | 1.2 | 5.7 | 0.67 | (1), (5) |
| 26 | 0.98 | 5.2 | 0.72 | (1), (5) |
| 27 | 1.1 | 6.1 | 0.73 | (1), (5) |
| 28 | 1.9 | 6.1 | 0.51 | (1), (5) |
| 29 | 0.82 | 6.1 | 0.87 | (3), (5) |
| 30 | 0.57 | 6.1 | 1.03 | (3), (5) |
| 31 | 0.96 | 6.1 | 0.80 | (3), (5) |
| 32 | 0.69 | 6.1 | 0.94 | (3), (5) |
| 33 | 0.83 | 6.1 | 0.86 | (2), (5) |
| 34 | 0.83 | 5.5 | 0.82 | (2), (5) |
| 35 | 0.60 | 6.1 | 1.00 | (2), (5) |
| 36 | 0.62 | 6.1 | 0.99 | (2), (5) |

TABLE 3-1-continued

<Evaluation 1>

| Number of coating liquid used in production of test piece | Electrical resistivity (MΩcm) | | Environmental variation digit | Structure contained out of formula (1) to formula (6) |
|---|---|---|---|---|
| | L/L environment | N/N environment | | |
| 37 | 0.88 | 6.1 | 0.84 | (4), (5) |
| 38 | 0.55 | 6.1 | 1.04 | (4), (5) |
| 39 | 2.1 | 6.1 | 0.47 | (1), (5), (6) |
| 40 | 1.9 | 6.1 | 0.49 | (1), (5), (6) |
| 41 | 11 | 28 | 0.40 | (1), (5), (6) |

TABLE 3-2

<Evaluation 1>

| Number of coating liquid used in production of test piece | Electrical resistivity (MΩcm) | | Environmental variation digit | Structure contained out of formula (1) to formula (6) |
|---|---|---|---|---|
| | L/L environment | N/N environment | | |
| 42 | $6.2 \times 10^9$ | $7.9 \times 10^{12}$ | 3.10 | — |
| 43 | 1.8 | 6.1 | 0.54 | — |
| 44 | 0.98 | 6.1 | 0.79 | — |
| 45 | 0.96 | 6.1 | 0.80 | — |

2. Production of Rubber Roller;
2-1. Production of Rubber Roller No. 1;
<Preparation of Epichlorohydrin Rubber Composition>

The respective materials whose kinds and amounts were shown in Table 4 were mixed with an open roll. Thus, an A-kneaded rubber composition was prepared.

TABLE 4

| | Material | Compounding amount (part(s) by mass) |
|---|---|---|
| Raw material rubber | Epichlorohydrin rubber | 100 |
| Processing aid | Zinc stearate | 1 |
| Vulcanization supplement accelerator | Zinc oxide | 5 |
| Filler | Heavy calcium carbonate | 60 |
| Electro-conductive agent | MT carbon black (Thermax Floform N990, Cancarb) | 5 |
| Plasticizer | Sebacic acid polyester | 5 |

Next, the respective materials whose kinds and amounts were shown in Table 5 were mixed into 176 parts by mass of the A-kneaded rubber composition with an open roll. Thus, an unvulcanized rubber composition was prepared.

TABLE 5

| | Material | Compounding amount (part(s) by mass) |
|---|---|---|
| Crosslinking agent | Sulfur | 1 |

TABLE 5-continued

| | Material | Compounding amount (part(s) by mass) |
|---|---|---|
| Vulcanization accelerator | Dibenzothiazyl disulfide (trade name: NOCCELER DM, manufactured by Ouchi Shinko Chemical Industrial Co., Ltd.) | 1 |
| | Tetramethylthiuram monosulfide (trade name: NOCCELER TS, manufactured by Ouchi Shinko Chemical Industrial Co., Ltd.) | 1 |

<Formation of Electro-conductive Elastic Layer (Epichlorohydrin Rubber Layer)>

A cored bar of a stainless bar having an outer diameter of 6 mm and a length of 258 mm was used as an electro-conductive mandrel. An apparatus having a mechanism for supplying the cored bar and a mechanism for discharging an electro-conductive roller was prepared in a crosshead extruder. The conveying speed of the cored bar was set to 60 mm/sec, a die having an inner diameter of 12.5 mm (diameter) was attached to a crosshead, and the temperatures of the extruder and the crosshead were adjusted to 80° C. The unvulcanized rubber composition was melted and extruded from the extruder. Thus, the layer of the unvulcanized rubber composition was formed on the periphery of the cored bar supplied to the crosshead.

Next, the cored bar whose peripheral surface had been covered with the layer of the unvulcanized rubber composition was loaded into a hot-air vulcanizing furnace at 170° C., and was then heated for 60 minutes so that the layer of the unvulcanized rubber composition was crosslinked. Thus, an electro-conductive layer was obtained. After that, the end portions of the electro-conductive layer were cut and removed so that its length was 228 mm. Finally, the surface of the electro-conductive layer was ground with a rotating grindstone so that the layer was molded into a crown shape having a diameter at its central portion of 12.2 mm and an average diameter at a 90-mm position from the central portion toward each of the left and right end portions of 12.0 mm. Thus, a rubber roller No. 1 having an electro-conductive elastic layer was obtained.

2-2. Production of Rubber Roller No. 2;

The composition of raw materials for an A-kneaded rubber composition was changed to that shown in Table 6. The respective materials whose kinds and amounts were shown in Table 7 were mixed into 177 parts by mass of the kneaded rubber composition with an open roll. Thus, an unvulcanized rubber composition was prepared. A rubber roller No. 2 having an epichlorohydrin rubber layer was obtained in the same manner as in the rubber roller No. 1 except that the unvulcanized rubber composition was used.

TABLE 6

| Material | | Compounding amount (part(s) by mass) |
|---|---|---|
| Raw material rubber | NBR (trade name: Nipol DN219, manufactured by ZEON CORPORATION) | 100 |
| Electro-conductive agent | Carbon black (trade name: TOKABLACK #7360SB, manufactured by TOKAI CARBON CO., LTD.) | 40 |
| Filler | Calcium carbonate (trade name: NANOX #30, manufactured by Maruo Calcium Co., Ltd.) | 20 |
| Vulcanization supplement accelerator | Zinc oxide | 5 |
| Processing aid | Stearic acid | 1 |

TABLE 7

| Material | | Compounding amount (part(s) by mass) |
|---|---|---|
| Crosslinking agent | Sulfur | 1.2 |
| Vulcanization accelerator | Tetrabenzylthiuram disulfide (trade name: TBZTD, manufactured by SANSHIN CHEMICAL INDUSTRY CO., LTD.) | 4.5 |

2-3. Production of Rubber Roller No. 3;

A cored bar of a stainless bar having an outer diameter of 8 mm (SUM22 material) and a length of 258 mm was used as an electro-conductive mandrel. A primer was applied and baked to serve as an adhesive for an electro-conductive layer and the cored bar, and then the cored bar was placed so as to be concentric with a cylindrical mold having an inner diameter of 12 mm. Next, raw materials shown in Table 8 below were injected into a cavity formed in the mold, and were then heated at 130° C. for 60 minutes to be cured. After that, the resultant was cooled to room temperature and removed from the mold. After that, the resultant was subjected to secondary vulcanization at 200° C. for 4 hours. Thus, a rubber roller No. 3 having a silicone rubber layer having a thickness of 3.0 mm was produced.

TABLE 8

| Raw Material | Compounding amount (part(s) by mass) |
|---|---|
| Liquid silicone rubber (trade name: SE6724A/B, manufactured by Dow Corning Toray Co., Ltd.) | 100 |
| Carbon black (trade name: TOKABLACK #7360SB, manufactured by TOKAI CARBON CO., LTD.) | 35 |
| Silica powder | 0.2 |
| Platinum catalyst | 0.1 |

3. Production of Charging Roller;

EXAMPLE 1

Production and Evaluations of Charging Roller No. 1;

The coating liquid No. 1 was applied onto the outer peripheral surface of the rubber roller No. 1 once by dipping, and was then air-dried at normal temperature for 30 minutes or more. Next, the resultant was dried by a circulating hot air dryer set at 80° C. for 1 hour, and was then further dried by a circulating hot air dryer set at 160° C. for 3 hours.

A dipping application immersion time was regulated to 9 seconds, and a dipping application lifting speed was regulated so that the initial speed was 20 mm/s and the final speed was 2 mm/s. The speed was linearly changed with time from 20 mm/s to 2 mm/s. Thus, a charging roller No. 1 having an ionic electro-conductive resin-containing layer on the outer periphery of an epichlorohydrin rubber electro-conductive layer was produced.

Figure 4A:
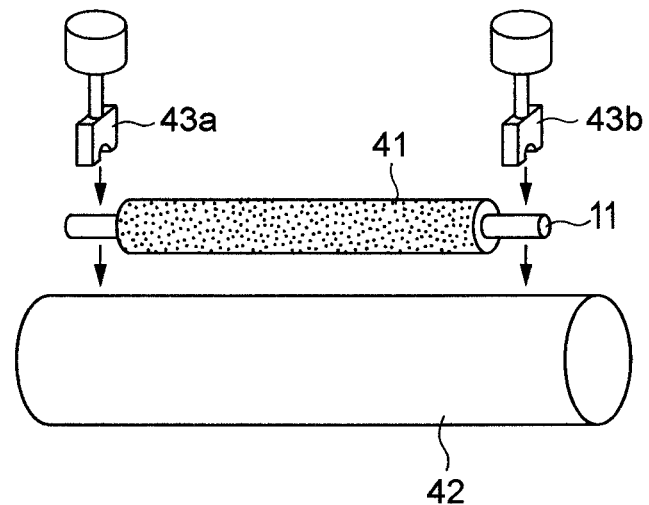
FIG. 4A is a schematic construction view of a current value-measuring machine.
Figure 4B:
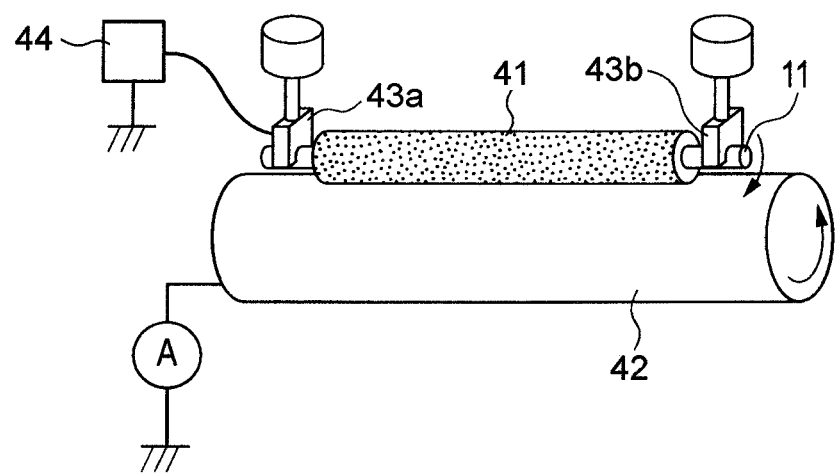
FIG. 4B is a schematic construction view of the current value-measuring machine.

<Evaluation 2> Evaluation of Environment Dependence of Electrical Resistivity of Charging Roller;

FIGS. 4A and 4B each illustrate a schematic construction view of a current value-measuring machine for a charging roller used in the present invention. Measured is a current value when the charging roller is energized while being brought into abutment with a columnar metal 42 having the same curvature as that of a photosensitive member under the same load as that in a usage state when the charging roller is used in an electrophotographic image forming apparatus as illustrated in each of FIGS. 4A and 4B. In FIG. 4A, bearings 43a and 43b are fixed to dead weights, and apply, to both ends of the electro-conductive mandrel of a charging roller 41, stresses for pressing the roller vertically downward. The columnar metal 42 is positioned in the vertical downward direction of the charging roller 41 so as to be parallel to the charging roller 41. Then, the charging roller 41 is pressed against the columnar metal 42 with the bearings 43a and 43b as illustrated in FIG. 4B while the columnar metal 42 is rotated with a driving apparatus (not shown). While the columnar metal 42 is rotated at the same rotational speed as that of the photosensitive drum in its usage state and the charging roller 41 is rotated in accordance with the rotation, a DC voltage of −200 V is applied with a power source 44. After a lapse of 2 seconds from the application of the voltage, the time average of a current flowing out of the columnar metal 42 is measured with an ammeter A, and the electrical resistance value of the roller is calculated from the time average of the results of 5 seconds of the measurement.

A DC voltage of 200 V was applied to each of the charging roller No. 1 acclimated by being left to stand under the N/N environment for 48 hours and the charging roller No. 1 acclimated by being left to stand under the L/L environment for 48 hours, and then its electrical resistance value was measured with such apparatus. Then, its volume resistivity under each environment was calculated from the electrical resistance value obtained by the measurement. In addition, the logarithm of a ratio between the electrical resistance value under the L/L environment and the electrical resistance value under the N/N environment "log(electrical resistance value under N/N environment)/(electrical resistance value under L/L environment)" was calculated in order that an influence of environmental variation might be confirmed. The value was defined as an environmental variation digit.

<Evaluation 3> Bleeding Evaluation;

The charging roller was placed on a polyethylene terephthalate (PET) sheet, and then a load of 500 g was applied to the axis at each of both ends of the charging roller so that the surface of the charging roller was pressed against the PET sheet. The state was maintained for 2 weeks under an environment having a temperature of 40° C. and a humidity of 95% R.H. After that, the charging roller was removed from the PET sheet, and then the portion of the surface of the PET sheet against which the surface of the charging roller had been pressed was observed with an optical microscope (at a magnification of 10). Then, the presence or absence of the adhesion of a product bleeding from the charging roller was observed and evaluated on the basis of the following criteria.

(Bleeding Evaluation Rank)

A: No bleeding is observed.

B: The adhesion of a trace amount of a bleeding product to part of the abutting portion is observed.

C: The adhesion of a bleeding product to the entire surface of the abutting portion is observed.

<Evaluations 4>Image Evaluations

<<Evaluation 4-1>>

A charging roller acclimated to the L/L environment by being left to stand under the environment for 48 hours was used in the formation of an electrophotographic image. When the charging ability of the charging roller is insufficient, a horizontal streak occurs in a halftone image. In view of the foregoing, the charging roller was evaluated for its charging ability in the L/L environment by observing a situation where a horizontal streak occurred in a halftone image.

Here, the term "halftone image" refers to an image which: is obtained by reducing the quantity of laser light to 35% as compared with that in the case where a black solid image is output; and is intermediate in charged potential between the black solid image and a white solid image.

In the evaluation, a laser printer (trade name: Laserjet 4700dn, manufactured by Hewlett-Packard Company) reconstructed so as to have a process speed of 300 mm/sec was used as an electrophotographic apparatus. In addition, the laser printer has a printing density of 600 dpi.

A specific evaluation method is as described below. First, the charging roller as an object to be evaluated was mounted on a process cartridge for the laser printer, and then the process cartridge was mounted on the laser printer. Then, such an electrophotographic image that the character of an alphabet "E" having a size of 4 points was printed on A4-sized paper so as to have a print density of 1% was output on 40,000 sheets. It should be noted that the formation of the electrophotographic images was performed according to an intermittent mode in which the rotation of the electrophotographic apparatus was stopped for 2 seconds every time two electrophotographic images were continuously output. Then, after the output of the 40,000 electrophotographic images, the process cartridge was taken out of the laser printer. The charging roller was removed from the process cartridge and then its surface was washed with water. The washed charging roller was mounted on the process cartridge again and then the process cartridge was mounted on the laser printer, followed by the output of 40,000 electrophotographic images in the same manner as in the foregoing. Next, one halftone image was output. The halftone image was visually observed and evaluated for the presence or absence of the occurrence of a horizontal streak-like defect resulting from a reduction in charging ability of the charging roller by the following criteria.

A: No horizontal streak-like image defect is observed in the halftone image.

B: A slight horizontal streak-like image defect is observed in very small part of the halftone image.

C: A horizontal streak-like image defect is observed in part of the halftone image but is not conspicuous.

D: A horizontal streak-like image defect is observed in part of the halftone image and is conspicuous.

<<Evaluation 4-2>>

A charging roller acclimated to the L/L environment by being left to stand under the environment for 48 hours was used in the formation of an electrophotographic image. When the charging ability of the charging roller is insufficient and a photosensitive member is nonuniformly charged, a spot-like defect may occur in a halftone image.

In the evaluation, a laser printer (trade name: Laserjet P4515n, manufactured by Hewlett-Packard Company) was prepared as an electrophotographic apparatus. The laser printer has a process speed of 370 mm/sec and a printing density of 1,200 dpi.

A specific evaluation method is as described below. First, the charging roller as an object to be evaluated was mounted on a process cartridge for the laser printer. Then, the process cartridge was reconstructed so that a voltage could be applied from the outside between the charging roller and the electrophotographic photosensitive member.

The process cartridge was mounted on the laser printer. An electrophotographic image was output on 40,000 sheets while a DC voltage of −600 V, and an AC voltage having a peak-to-peak voltage Vpp of 1,600 V and a frequency of 3,000 Hz were applied between the charging roller and the electrophotographic photosensitive member. Here, the electrophotographic image was such an electrophotographic image that horizontal lines each having a width of 2 dots were drawn at an interval of 176 dots in the rotation direction of the photosensitive member.

It should be noted that the formation of the electrophotographic images was performed according to such an intermittent mode that the rotation of. the electrophotographic apparatus was stopped for 2 seconds every time one electrophotographic image was output.

After the output of the 40,000 electrophotographic images, a halftone image was output. In that case, every time one halftone image was output, the Vpp of the AC voltage to be applied between the charging roller and the electrophotographic photosensitive member was increased from 1,200 V, and the output of the halftone image was continued until a spot-like defect disappeared from the halftone image. It should be noted that the frequency of the AC voltage at this time was set to 2,931 Hz. Then, the AC voltage at which the spot-like defect disappeared from the halftone image was described as the result of Evaluation 4-2. It can be said that the smaller the value for the voltage, the relatively higher the charging ability of the charging roller.

EXAMPLES 2 to 40

Production and Evaluations of Charging Rollers Nos. 2 to 40;

Charging rollers Nos. 2 to 40 were produced in the same manner as in the charging roller No. 1 except that the coating liquid No. 1 was changed to the coating liquids shown in Table 9-1 and Table 9-2, and were then similarly evaluated.

EXAMPLES 41 to 46

Production and Evaluations of Charging Rollers Nos. 41 to 46;

Charging rollers Nos. 41 to 46 were produced in the same manner as in the charging roller No. 1 except that: the rubber roller No. 2 was used; and the coating liquid No. 1 was changed to the coating liquids shown in Table 9-1 and Table 9-2, and were then subjected to Evaluation 2 to Evaluations 4.

EXAMPLE 47

Production and Evaluations of Charging Roller No. 47;

A cored bar of a stainless bar having an outer diameter of 6 mm and a length of 258 mm was prepared as an electro-conductive mandrel. Then, a primer was applied and baked to serve as an adhesive for an electro-conductive layer and the cored bar in a 40 to 248-mm region from the left end portion of the cored bar, and then the cored bar was placed so as to be concentric with a cylindrical mold having an inner diameter of 16 mm. Next, the coating liquid No. 41 was injected into a cavity formed in the mold. The mold was heated, and the liquid was subjected to vulcanization curing at 80° C. for 1 hour and then at 160° C. for 3 hours, followed by the removal of the resultant from the mold. Thus, a charging roller No. 47 having an electro-conductive layer formed on the peripheral surface of a cored bar was produced.

EXAMPLE 48

Production and Evaluations of Charging Roller No. 48;

A protective layer was provided on the electro-conductive layer of the charging roller No. 1 by the following method.

Methyl isobutyl ketone was added to a caprolactone-modified acrylic polyol solution and then the solid content concentration was adjusted to 10 mass %. 15 Parts by mass of carbon black (HAF), 35 parts by mass of needle-like rutile-type titanium oxide fine particles, 0.1 part by mass of modified dimethyl silicone oil, and 80.14 parts by mass of a mixture containing the respective butanone oxime block bodies of hexamethylene diisocyanate (HDI) and isophorone diisocyanate (IPDI) at a ratio of 7:3 were loaded with respect to 100 parts by mass of the solid content of the acrylic polyol solution. Thus, a mixed solution was prepared. At this time, the mixture of the block HDI and the block IPDI was added so that a ratio "NCO/OH" was 1.0.

210 Grams of the mixed solution and 200 g of glass beads having an average particle diameter of 0.8 mm as dispersion media were mixed into a 450-mL glass bottle, and were then dispersed with a paint shaker dispersing machine for 24 hours. After the dispersion, 5.44 parts by mass (an amount corresponding to 20 parts by weight with respect to 100 parts by weight of the acrylic polyol) of crosslink-type acrylic particles (trade name: MR50G; manufactured by Soken Chemical & Engineering Co., Ltd.) were added as resin particles to the resultant, and were then dispersed for an additional thirty minutes. Thus, a paint for forming a protective layer was obtained.

The paint for forming a protective layer thus obtained was applied onto the charging roller No. 1 once by dipping, and was then air-dried at normal temperature for 30 minutes. Next, the resultant was dried by a circulating hot air dryer set at a temperature of 90° C. for 1 hour, and was then further dried by a circulating hot air dryer set at a temperature of 160° C. for 1 hour. Thus, a protective layer was formed on the peripheral surface of the electro-conductive layer of the charging roller No. 1.

It should be noted that a dipping application immersion time was regulated to 9 seconds, and a dipping application lifting speed was regulated so that the initial speed was 20 mm/s and the final speed was 2 mm/s. The speed was linearly changed with time from 20 mm/s to 2 mm/s. The charging roller thus obtained was defined as a charging roller No. 48 and then subjected to Evaluation 3 to Evaluations 4.

Table 9-1 and Table 9-2 show the results of the evaluations of Examples 1 to 48 described above.

TABLE 9-1

| | | Charging roller construction | | | Charging roller characteristic evaluation | | | | | |
| | | | Second electro-conductive layer | | Evaluation 2 | | | | | |
| | | | | Structure | Electrical resistivity | | | | Image evaluation | |
| | | Rubber roller | Coating liquid | contained out | (MΩ cm) | | | | | Evaluation |
| Example | Charging roller No. | No. | No. | of formula (1) to formula (6) | L/L environment | N/N environment | Environmental variation digit | Evaluation 3 | Evaluation 4-1 | 4-2 (V) |
|---|---|---|---|---|---|---|---|---|---|---|
| 1 | 1 | 1 | 1 | (1), (5), (6) | 2.2 | 8.0 | 0.55 | A | A | 1550 |
| 2 | 2 | 1 | 2 | (1), (5), (6) | 2.1 | 8.0 | 0.58 | A | A | 1560 |
| 3 | 3 | 1 | 3 | (1), (5) | 0.89 | 8.0 | 0.95 | A | B | 1680 |
| 4 | 4 | 1 | 4 | (1), (5) | 0.74 | 8.0 | 1.03 | A | B | 1700 |
| 5 | 5 | 1 | 5 | (1), (5) | 2.0 | 8.0 | 0.61 | A | B | 1650 |
| 6 | 6 | 1 | 6 | (1), (5), (6) | 2.1 | 8.0 | 0.57 | B | A | 1560 |
| 7 | 7 | 1 | 7 | (1), (5) | 1.3 | 8.0 | 0.79 | B | B | 1680 |
| 8 | 8 | 1 | 8 | (1), (5), (6) | 2.0 | 8.0 | 0.60 | B | A | 1580 |
| 9 | 9 | 1 | 9 | (1), (5) | 1.1 | 8.0 | 0.86 | B | B | 1680 |
| 10 | 10 | 1 | 10 | (1), (5) | 1.1 | 8.0 | 0.88 | B | B | 1680 |
| 11 | 11 | 1 | 11 | (1), (5) | 0.81 | 8.0 | 0.99 | B | B | 1680 |
| 12 | 12 | 1 | 12 | (1), (5) | 0.76 | 8.0 | 1.02 | B | B | 1680 |
| 13 | 13 | 1 | 13 | (1), (5) | 1.7 | 8.0 | 0.67 | B | B | 1650 |
| 14 | 14 | 1 | 14 | (1), (5) | 1.6 | 8.0 | 0.71 | B | B | 1660 |
| 15 | 15 | 1 | 15 | (1), (5), (6) | 2.2 | 8.0 | 0.56 | A | A | 1550 |
| 16 | 16 | 1 | 16 | (1), (5) | 0.98 | 8.0 | 0.91 | A | B | 1680 |
| 17 | 17 | 1 | 17 | (1), (5), (6) | 2.2 | 8.0 | 0.57 | B | A | 1560 |
| 18 | 18 | 1 | 18 | (1), (5) | 1.3 | 8.0 | 0.77 | B | B | 1680 |
| 19 | 19 | 1 | 19 | (1), (5) | 1.2 | 8.0 | 0.84 | B | B | 1650 |
| 20 | 20 | 1 | 20 | (1), (5) | 1.1 | 8.0 | 0.86 | B | B | 1680 |
| 21 | 21 | 1 | 21 | (1), (5) | 1.3 | 8.0 | 0.79 | B | B | 1650 |
| 22 | 22 | 1 | 22 | (1), (5), (6) | 1.7 | 8.0 | 0.67 | A | A | 1580 |
| 23 | 23 | 1 | 23 | (1), (5) | 0.86 | 8.0 | 0.97 | A | B | 1680 |

TABLE 9-1-continued

| | | Charging roller construction | | | Charging roller characteristic evaluation | | | | | |
|---|---|---|---|---|---|---|---|---|---|---|
| | | | Second electro-conductive layer | | Evaluation 2 | | | | Image evaluation | |
| | | | | Structure | Electrical resistivity (MΩ cm) | | | | | Evaluation |
| Example | Charging roller No. | Rubber roller No. | Coating liquid No. | contained out of formula (1) to formula (6) | L/L environment | N/N environment | Environmental variation digit | Evaluation 3 | Evaluation 4-1 | 4-2 (V) |
| 24 | 24 | 1 | 24 | (1), (5), (6) | 1.9 | 8.0 | 0.62 | B | A | 1590 |
| 25 | 25 | 1 | 25 | (1), (5) | 1.0 | 8.0 | 0.87 | B | B | 1680 |
| 26 | 26 | 1 | 26 | (1), (5) | 0.82 | 8.0 | 0.92 | B | B | 1680 |
| 27 | 27 | 1 | 27 | (1), (5) | 0.94 | 8.0 | 0.93 | B | B | 1680 |
| 28 | 28 | 1 | 28 | (1), (5) | 1.6 | 8.0 | 0.71 | B | B | 1650 |
| 29 | 29 | 1 | 29 | (3), (5) | 0.68 | 8.0 | 1.07 | A | C | 1680 |
| 30 | 30 | 1 | 30 | (3), (5) | 0.47 | 8.0 | 1.23 | A | C | 1680 |

TABLE 9-2

| | | Charging roller construction | | | Charging roller characteristic evaluation | | | | | |
|---|---|---|---|---|---|---|---|---|---|---|
| | | | Second electro-conductive layer | | Evaluation 2 | | | | Image evaluation | |
| | | | | Structure | Electrical resistivity (MΩ cm) | | | | | Evaluation |
| Example | Charging roller No. | Rubber roller No. | Coating liquid No. | contained out of formula (1) to formula (6) | L/L environment | N/N environment | Environmental variation digit | Evaluation 3 | Evaluation 4-1 | 4-2 (V) |
| 30 | 30 | 1 | 30 | (3), (5) | 0.47 | 8.0 | 1.23 | A | C | 1680 |
| 31 | 31 | 1 | 31 | (3), (5) | 0.80 | 8.0 | 1.00 | B | C | 1700 |
| 32 | 32 | 1 | 32 | (3), (5) | 0.58 | 8.0 | 1.14 | B | C | 1700 |
| 33 | 33 | 1 | 33 | (2), (5) | 0.69 | 8.0 | 1.06 | A | C | 1650 |
| 34 | 34 | 1 | 34 | (2), (5) | 0.69 | 7.3 | 1.02 | A | C | 1650 |
| 35 | 35 | 1 | 35 | (2), (5) | 0.50 | 8.0 | 1.20 | B | C | 1680 |
| 36 | 36 | 1 | 36 | (2), (5) | 0.52 | 8.0 | 1.19 | B | C | 1680 |
| 37 | 37 | 1 | 37 | (4), (5) | 0.73 | 8.0 | 1.04 | A | C | 1680 |
| 38 | 38 | 1 | 38 | (4), (5) | 0.46 | 8.0 | 1.24 | B | C | 1700 |
| 39 | 39 | 1 | 39 | (1), (5), (6) | 1.7 | 8.0 | 0.67 | A | A | 1580 |
| 40 | 40 | 1 | 40 | (1), (5), (6) | 1.6 | 8.0 | 0.69 | A | A | 1580 |
| 41 | 41 | 2 | 1 | (1), (5), (6) | 2.0 | 8.0 | 0.60 | A | A | 1500 |
| 42 | 42 | 2 | 3 | (1), (5) | 1.1 | 8.0 | 0.87 | A | A | 1630 |
| 43 | 43 | 2 | 6 | (1), (5), (6) | 2.0 | 8.0 | 0.60 | B | B | 1530 |
| 44 | 44 | 2 | 14 | (1), (5), (6) | 2.1 | 8.0 | 0.58 | A | A | 1500 |
| 45 | 45 | 2 | 15 | (1), (5) | 1.0 | 8.0 | 0.90 | A | B | 1630 |
| 46 | 46 | 2 | 21 | (1), (5), (6) | 2.0 | 8.0 | 0.60 | A | A | 1500 |
| 47 | 47 | — | 41 | (1), (5), (6) | 9.2 | 29 | 0.50 | A | A | 1550 |
| 48 | 48 | 1 | 1 | (1), (5), (6) | — | — | — | A | A | 1460 |

COMPARATIVE EXAMPLES 1 to 3

Production and Evaluations of Charging Rollers Nos. C-1 to C-3;

Charging rollers Nos. C-1 to C-3 were produced in the same manner as in the charging roller No. 1 except that the coating liquids Nos. 42, 43, and 44 were used, and were then subjected to Evaluation 2 to Evaluations 4.

COMPARATIVE EXAMPLE 4

Production and Evaluations of Charging Roller No. C-4;

The coating liquid No. 45 was applied onto the electro-conductive elastic layer of the rubber roller 1 by dipping so that its thickness after drying was 5 μm. Next, the coating film of the coating liquid No. 45 was heated at a temperature of 120° C. for 7 seconds to be cured. Thus, a charging roller No. C-4 was produced. The charging roller No. C-4 was subjected to Evaluation 2 to Evaluations 4.

Table 10 shows the results of Comparative Examples 1 to 4.

TABLE 10

| | | Charging roller construction | | | Charging roller characteristic evaluation | | | | | |
|---|---|---|---|---|---|---|---|---|---|---|
| | | | Second electro-conductive layer | | Evaluation 2 | | | | Image evaluation | |
| | | | Structure | | Electrical resistivity | | | | | |
| | | Rubber | Coating | contained out | (MΩ cm) | | | | | Evaluation |
| Comparative Example | Charging roller No. | roller No. | liquid No. | of formula (1) to formula (6) | L/L environment | N/N environment | Environmental variation digit | Evaluation 3 | Evaluation 4-1 | 4-2 (V) |
| 1 | C-1 | 1 | 42 | — | $5.2 \times 10^9$ | $1.0 \times 10^{13}$ | 3.30 | B | — | — |
| 2 | C-2 | 1 | 43 | — | 1.5 | 8.0 | 0.74 | D | C | 1650 |
| 3 | C-3 | 1 | 44 | — | 0.82 | 8.0 | 0.99 | C | D | 1750 |
| 4 | C-4 | 1 | 45 | — | 0.80 | 8.0 | 1.00 | C | C | 1800 |

4. Production of Developing Roller;

EXAMPLE 49

Production and Evaluations of Developing Roller No. 1;

The coating liquid No. 1 was applied onto the outer peripheral surface of the rubber roller No. 3 once by dipping, and was then air-dried at normal temperature (25° C.) for 30 minutes. Next, the resultant was dried by a circulating hot air dryer set at a temperature of 80° C. for 1 hour, and was then further dried by a circulating hot air dryer set at a temperature of 160° C. for 3 hours. A dipping application immersion time was regulated to 9 seconds, and a dipping application lifting speed was regulated so that the initial speed was 20 mm/s and the final speed was 2 mm/s. The speed was linearly changed with time from 20 mm/s to 2 mm/s. Thus, a developing roller No. 1 having an ionic electro-conductive resin-containing layer on the outer periphery of a silicone rubber layer was produced. The developing roller No. 1 was subjected to Evaluation 3 and Evaluation 5 to be described below.

<Evaluation 5>
<Image Evaluation>

A developing roller acclimated to the L/L environment by being left to stand under the environment for 48 hours was used in the formation of an electrophotographic image. Used as an electrophotographic apparatus in the evaluation was a laser printer (trade name: LBP5400, manufactured by Canon Inc.) reconstructed so as to output a recording medium at a speed of 150 mm/sec. In addition, the laser printer has a printing density of 600 dpi.

In addition, an abutting pressure between the developing roller and a photosensitive drum, and the penetration level of the roller were adjusted so that a toner coating amount on the developing roller was 0.35 mg/cm². Further, a toner-supplying roller made of a soft urethane sponge for scraping old toner off the developing roller and supplying new toner to the developing roller was provided.

A specific evaluation method is as described below. First, the charging roller as an object to be evaluated was mounted on a process cartridge for the laser printer, and then the process cartridge was mounted on the laser printer. Then, such an electrophotographic image that horizontal lines each having a width of 2 dots were drawn at an interval of 50 dots in a direction perpendicular to the rotation direction of the photosensitive drum was continuously output on 20,000 sheets. Subsequently, such an electrophotographic image that horizontal lines each having a width of 1 dot were drawn at an interval of 2 dots in the direction perpendicular to the rotation direction of the photosensitive drum was output on 1 sheet, and then the electrophotographic image was visually observed and evaluated on the basis of the following criteria.

A: Nearly no change in image density occurs and no image failure in correspondence with the rotational period of the developing roller is observed.

B: A change in image density is slightly observed but no image failure in correspondence with the rotational period of the developing roller is observed.

C: A change in image density is observed and an image failure in correspondence with the rotational period of the developing roller is slightly observed.

D: A change in image density is large and an image failure in correspondence with the rotational period of the developing roller is observed.

EXAMPLE 50 TO EXAMPLE 63

Production and Evaluations of Developing Rollers Nos. 2 to 15;

Developing rollers Nos. 2 to 15 were produced in the same manner as in the developing roller No. 1 except that the coating liquid No. 1 was changed to the coating liquids shown in Table 11, and were then similarly evaluated.

Table 11 shows the results of Examples 49 to 63.

TABLE 11

| Example | Developing roller No. | Rubber roller No. | Coating liquid No. | Structure contained out of formula (1) to formula (6) | Evaluation 3 | Evaluation 5 |
|---|---|---|---|---|---|---|
| 49 | 1 | 3 | 1 | (1), (5), (6) | A | A |
| 50 | 2 | 3 | 2 | (1), (5), (6) | A | A |
| 51 | 3 | 3 | 3 | (1), (5) | B | A |
| 52 | 4 | 3 | 5 | (1), (5) | B | A |
| 53 | 5 | 3 | 8 | (1), (5), (6) | B | B |
| 54 | 6 | 3 | 9 | (1), (5) | B | B |
| 55 | 7 | 3 | 12 | (1), (5) | B | B |
| 56 | 8 | 3 | 13 | (1), (5) | B | B |
| 57 | 9 | 3 | 14 | (1), (5) | B | B |
| 58 | 10 | 3 | 22 | (1), (5), (6) | A | A |
| 59 | 11 | 3 | 23 | (1), (5) | B | A |
| 60 | 12 | 3 | 27 | (1), (5) | B | B |
| 61 | 13 | 3 | 28 | (1), (5) | B | B |
| 62 | 14 | 3 | 39 | (1), (5), (6) | A | A |
| 63 | 15 | 3 | 40 | (1), (5), (6) | A | A |

5. Production and Evaluation of Electrolyte Membrane;

EXAMPLE 64

Figure 5:
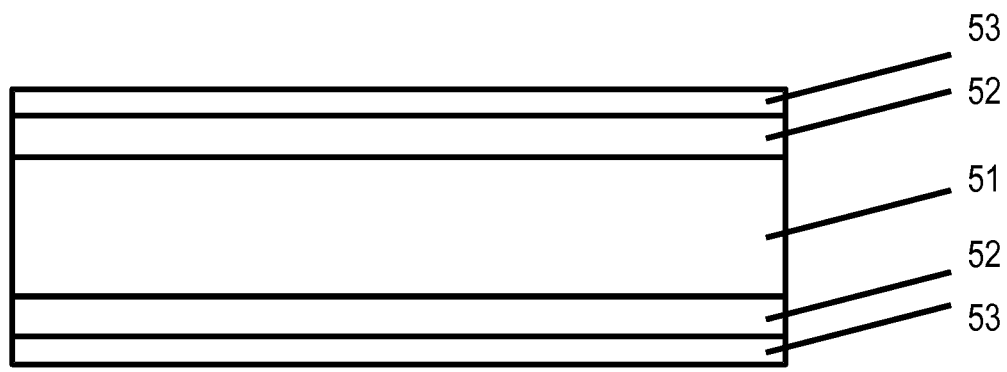
FIG. 5 is a schematic construction view of a fuel cell according to the present invention.

An electrolyte membrane for a fuel cell was produced by the following method. FIG. 5 illustrates a schematic construction view of a fuel cell according to the present invention. In FIG. 5, reference numeral 51 represents an ionic electro-conductive resin membrane, reference numeral 52 represents a catalyst sheet, and reference numeral 53 represents an electrode. The main agent, curing agent, and ionic electro-conductive agent shown in Table 1-1 to Table 1-3 were mixed in such a combination and compounding amounts as shown in Table 12 into a solvent whose amount was also shown in Table 12, and then the mixture was sufficiently stirred in the air at room temperature (25° C.). Thus, a coating liquid No. 46 was obtained.

TABLE 12

| Coating liquid No. | Main agent | | Curing agent | | Ionic electro-conductive agent | | Solvent | |
|---|---|---|---|---|---|---|---|---|
| | Kind | Compounding amount (g) | Kind | Compounding amount (g) | Kind | Compounding amount (g) | Kind | Compounding amount (g) |
| 46 | A | 4.96 | A | 3.29 | A | 0.90 | IPA | 10 |

The coating liquid No. 46 was formed into a film on a glass substrate by a solvent cast method. Thus, an ionic electro-conductive resin membrane having a thickness of 80 μm was obtained.

The ionic conductance of the resultant ionic electro-conductive resin membrane was determined through calculation from the real impedance intercept of a Cole-Cole plot by employing an AC impedance method involving measuring a resistance portion through the application of an alternating current between electrodes. The measurement was performed at a temperature of 50° C. The ionic conductance of the ionic electro-conductive resin membrane was measured under each of environments having relative humidity of 50%, 60%, 70%, and 80%. Table 13 shows the results.

TABLE 13

| Relative humidity (%) | Ionic conductance (S/cm) |
|---|---|
| 50 | $1.5 \times 10^{-3}$ |
| 60 | $4.6 \times 10^{-3}$ |
| 70 | $8.1 \times 10^{-3}$ |
| 80 | $1.1 \times 10^{-2}$ |

6. Production and Evaluation of Fuel Cell;

EXAMPLE 65

Described below is an example of a method of producing each of a membrane-electrode assembly and a fuel cell each formed of the ionic electro-conductive resin membrane produced in Example 64 described above.

A catalyst powder (trade name: HiSPEC 1000, manufactured by Johnson & Matthey) and an electrolytic solution (trade name: Nafion solution, manufactured by Du Pont) were prepared. First, a mixed dispersion liquid of the catalyst powder and the electrolytic solution was produced, and then the catalyst sheet 52 was produced on a sheet made of a polytetrafluoroethylene (PTFE) by employing a doctor blade method. Next, the catalyst sheet was hot-press transferred onto the ionic electro-conductive resin membrane 51 according to Example 64 by a decal method. Thus, a membrane-electrode assembly was produced. Further, the membrane-electrode assembly was interposed between the carbon cloth electrodes 53 (manufactured by E-TEK), and then the resultant was interposed between and fastened with collectors. Thus, a fuel cell was produced.

A hydrogen gas was supplied to the anode side of the fuel cell thus produced at an injection rate of 300 ml/min, air was supplied to the cathode side thereof, a cell outlet pressure was set to an atmospheric pressure, the relative humidity of both the anode and the cathode were set to 50%, and a cell temperature was set to 50° C. When voltage measurement was performed at a constant current density of 300 mA/cm², a predetermined output was obtained after a lapse of 25 seconds and a cell potential at the time was 580 mV.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-074975, filed Mar. 30, 2011, and 2012-036566, filed Feb. 22, 2012, which are hereby incorporated by reference herein in their entirety.

What is claimed is:

1. An electro-conductive member for electrophotography, comprising:
an electro-conductive mandrel; and
an electro-conductive layer,
wherein:
the electro-conductive layer comprises an ionic electro-conductive resin and an ion carrier; and
the ionic electro-conductive resin has at least one structure selected from the group consisting of structures represented by the following formulae (1), (2), (3), and (4), and a structure represented by the following formula (5):

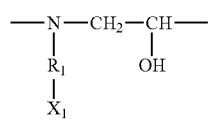

(1)

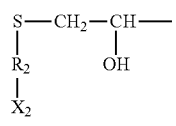

(2)

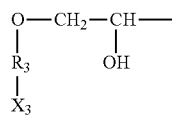

(3)

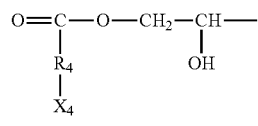

(4)

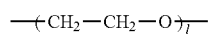

(5)

in the formula (1) to the formula (5), $R_1$, $R_2$, $R_3$, and $R_4$ each represent a divalent organic group, $X_1$, $X_2$, $X_3$, and $X_4$ each independently represent a sulfonic group or a quaternary ammonium base, and l represents an integer of 1 or more and 23 or less.

2. The electro-conductive member for electrophotography according to claim 1, wherein the ionic electro-conductive resin has a structure represented by the following formula (6):

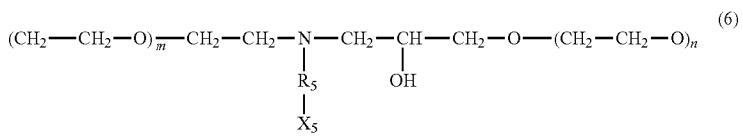

(6)

in the formula (6), $R_5$ represents a divalent organic group, $X_5$ represents a sulfonic group or a quaternary ammonium base, m represents an integer of 1 or more and 18 or less, and n represents an integer of 1 or more and 23 or less.

3. The electro-conductive member for electrophotography according to claim 2, wherein in the formula (6), $R_5$ represents a methylene group and $X_5$ represents a sulfonic group.

4. The electro-conductive member for electrophotography according to claim 1, wherein the ionic electro-conductive resin contains a resin obtained by polymerizing a polyalkylene glycol bis-2-aminoethylether and a polyethylene glycol diglycidyl ether.

5. The electro-conductive member for electrophotography according to claim 1, wherein the ionic electro-conductive resin contains a resin obtained by polymerizing a polyalkylene glycol bis-2-aminoethylether and an ethylene glycol diglycidyl ether.

6. An electrophotographic apparatus, comprising:
a charging member; and
a developing member,
wherein one, or each of both, of the charging member and the developing member comprises the electro-conductive member for electrophotography according to claim 1.

7. A process cartridge, comprising:
an electrophotographic photosensitive member; and
one or both selected from a charging member and a developing member,
wherein:
one, or each of both, of the charging member and the developing member comprises the electro-conductive member for electrophotography according to claim 1; and
the process cartridge is detachably mountable to a main body of an electrophotographic apparatus.

8. An electro-conductive member for electrophotography, comprising:
an electro-conductive mandrel; and
an electro-conductive layer,
wherein:
the electro-conductive layer comprises an ionic electro-conductive resin and an ion carrier; and
the ionic electro-conductive resin has
at least one structure selected from the group consisting of structures represented by the following formulae (1), (2), (3), and (4) and a structure represented by the following formula (5):

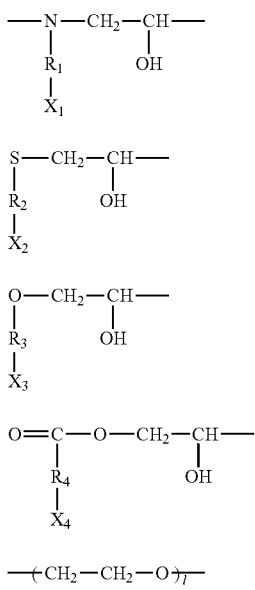

in the formula (1) to the formula (5), $R_1$, $R_2$, $R_3$, and $R_4$ each represent a divalent organic group, $X_1$ represents a quaternary ammonium base, and $X_2$, $X_3$, and $X_4$ each independently represent a sulfonic group or a quaternary ammonium base, and 1 represents an integer of 1 or more and 23 or less.

9. An electro-conductive member for electrophotography, comprising:
an electro-conductive mandrel; and
an electro-conductive layer,
wherein:
the electro-conductive layer comprises an ionic electro-conductive resin and an ion carrier; and
the ionic electro-conductive resin has
at least one structure selected from the group consisting of structures represented by the following formulae (2), (3), and (4), and
a structure represented by the following formula (5):

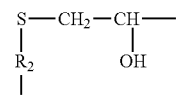

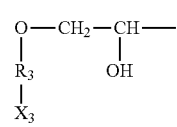

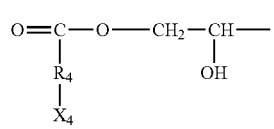

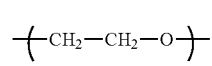

in the formula (2) to the formula (5), $R_2$, $R_3$, and $R_4$ each represent a divalent organic group, $X_2$, $X_3$, and $X_4$ each independently represent a sulfonic group or a quaternary ammonium base, and 1 represents an integer of 1 or more and 23 or less.

* * * * *